March 19, 1963     L. D. PAYNE ET AL     3,082,142
METHOD OF MAKING A HONEYCOMB STRUCTURE FROM CORRUGATED
BOARD WITH FACING SHEETS OF CORRUGATED BOARD
Filed May 6, 1960     2 Sheets-Sheet 1

LOCKETT D. PAYNE
CHARLES JACK BEAN
INVENTORS

BY *Herbert J. Brown*
ATTORNEY

March 19, 1963  L. D. PAYNE ET AL  3,082,142
METHOD OF MAKING A HONEYCOMB STRUCTURE FROM CORRUGATED
BOARD WITH FACING SHEETS OF CORRUGATED BOARD
Filed May 6, 1960  2 Sheets-Sheet 2

LOCKETT D. PAYNE
CHARLES JACK BEAN
INVENTORS

BY Herbert J. Brown
ATTORNEY

United States Patent Office 3,082,142
Patented Mar. 19, 1963

3,082,142
METHOD OF MAKING A HONEYCOMB STRUCTURE FROM CORRUGATED BOARD WITH FACING SHEETS OF CORRUGATED BOARD
Lockett D. Payne and Charles Jack Bean, Fort Worth, Tex., assignors to First Container Corporation, Fort Worth, Tex., a corporation of Texas
Filed May 6, 1960, Ser. No. 27,379
6 Claims. (Cl. 156—197)

This invention relates to core materials for laminated panels and has reference to a method for making a honeycomb structure from a sheet of corrugated board.

Generally, the invention is directed to means for cutting, perforating and scoring a corrugated sheet so that the same may be folded and subsequently expanded into a honeycomb filler for incorporation into a structural panel. The cutting and folding of flexible sheet materials to form artificial honeycomb structures has been known and practiced heretofore. Patent No. 1,389,294, to Dean, for instance, teaches the formation of artificial honeycombs from thin flexible sheets. The use of corrugated board in this type of process, however, has not been satisfactory because the thickness of the board and its resistance to bending have prevented effective folding and have tended to return a corrugated sheet to its original planar form upon expansion after folding. Resistance of corrugated board to folding has also tended to prevent the maintaining of vertical walls in a honeycomb core and has caused irregularities in the thickness of the core which, in turn, makes it difficult to bond the core to facing sheets of a panel. The present invention makes effective folding and expansion of corrugated board possible by providing perforations and score lines on a corrugated sheet so that folding severs one liner and the fluting therebeneath without severing the opposite liner; once the separation has been accomplished along a pre-selected perforated line the folded sheet may be expanded into a honeycomb and will bend along scored lines so that the sheet no longer tends to reassume its former shape. The method of perforating and selectively securing folded corrugated sheets also permits the formation of a honeycomb structure which is substantially uniform in thickness and hence well adapted for incorporation into a laminated panel.

An object of the present invention is to provide means for making a honeycomb filler from corrugated board.

Another object of the invention is to provide means for transforming a wide sheet of corrugated board into a honeycomb structure.

A further object of the invention is to provide a method for converting a sheet of laminated material such as corrugated board into a continuous and uniform honeycomb structure.

Another object of the invention is to provide a method whereby laminated materials having such thickness as would otherwise resist folding and expansion into a cellular core may be formed into a useful core structure.

A particular object of the invention is to provide means whereby a laminated panel having an advantageous strength to weight ratio may be formed from sheets of corrugated board.

An additional object of the invention is to provide a method whereby panels filled with a honeycomb core structure may be fabricated with substantially uniform thickness of the core, and whereby parts of the core need not be cemented to one another.

These and other objects will become apparent from the following description and the accompanying drawings, wherein.

Figure 1:
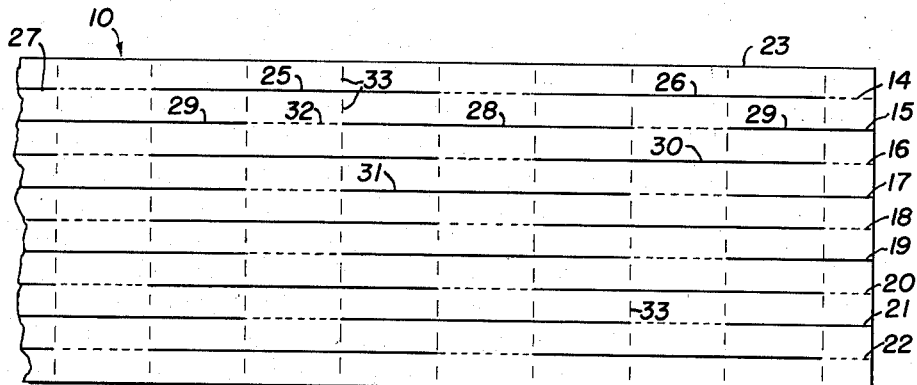
FIGURE 1 is a broken plan view of a sheet of corrugated board which has been slotted, perforated and scored in accordance with the present invention.
Figure 3:
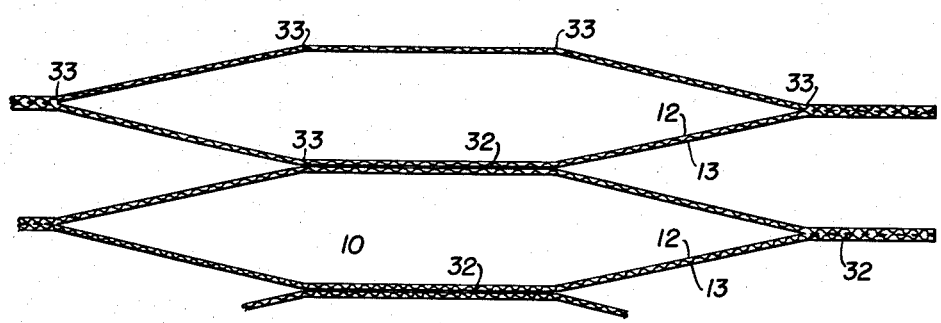
FIGURE 3 is a broken plan view of a partially expanded honeycomb section as defined herein.
Figure 2:
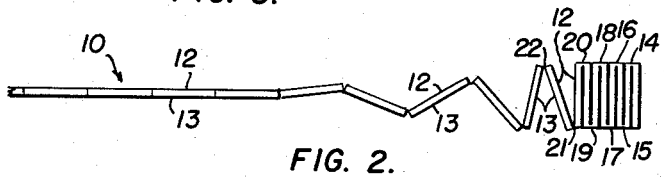
FIGURE 2 is a broken side elevational view of a partially folded corrugated sheet of the invention.
Figure 4:
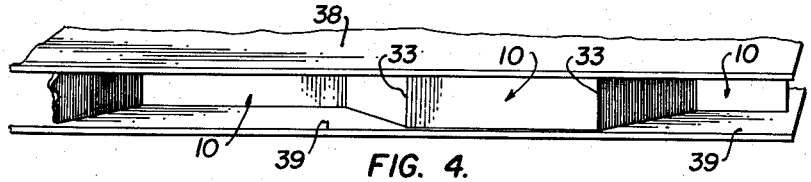
FIGURE 4 is a fragmentary perspective view of a completed panel of the invention.

With particular reference to the drawings, a rectangular sheet 10 of corrugated board is shown in a conventional form of construction including a fluting member 11 bonded between flexible liners 12 and 13 and may be of any predetermined length, width and thickness. As indicated by solid lines in FIGURE 1, the sheet 10 is slotted at regular intervals along each of a plurality of regularly spaced rows 14 through 22 which are parallel with one another and also parallel with longitudinal edges 23 and 24 of the sheet 10. Considering the slotted rows 14–22 separately, one slot 25 of the first row 14 is formed perpendicularly through opposite liners 12 and 13 and through the fluting 11 therebetween; a second slot 26 in the first row 14 likewise penetrates and communicates with opposite liners 12 and 13 and is identical in length to the first slot 25. Each of the slots 25 and 26 is disposed longitudinally through the sheet 10 and each is in longitudinal alignment with the other. The distance between next adjacent ends of the first and second slots 25 and 26 of the first row 14 is equal to one-third of the length of each of the slots. Additional slots 27 of the first row 14 are equal in length to the first and second slots 25 and 26 and are spaced from one another by a distance equaling one-third of the length thereof. A slot 28, equal in length to the slots 25–27 previously described, is formed through the sheet 10 at such a position in the second row 15 that its center is in lateral alignment with the center of the spacing between the first and second slots 25 and 26 of the first row 14. A plurality of slots 29 are formed in the second row 15 and are longitudinally spaced from one another by a distance equaling the spacings between slots 25–27 of the first row 14 so that the center of each slot 29 of the second row 15 is in lateral alignment with the center of a corresponding spacing between slots 25–27 of the first row 14. A plurality of slots 30 are formed in like manner through the sheet 10 in the third row 16 so that each slot of the third row is in lateral alignment with a corresponding slot in the first row 14; likewise, a plurality of slots 31 in the fourth row 17 are positioned in lateral alignment with corresponding slots in the second row 15. Thus, regularly spaced longitudinal rows 14 through 22 of slots are formed throughout the width of the sheet 10 with the slots of even numbered rows in lateral alignment with slots of the first row 14 and slots of odd numbered rows in lateral alignment with slots of the second row 15.

Between ends of next adjacent slots in each row 14–22, a plurality of regularly spaced and longitudinally aligned perforations 32 extend perpendicularly through opposite liners 12 and 13 and the fluting 11 of the sheet 10. The longitudinal extent of each perforation 32 and the spacings between perforations are dependent upon the construction of the corrugated sheet and may vary with the thicknesses of different corrugated boards and the strengths of the papers from which they are made. The sheet 10 is laterally scored so that a plurality of score lines 33 each extending continuously across the width of the sheet 10 intersect the ends of the various slots 25–31. Since slots of alternate rows are longitudinally offset from one another, the score lines intersecting ends of slots in odd numbered rows intersect slots in even numbered lines intermediate their ends. Each slot is thus intersected by four score lines, two of which intersect ends of the slot and two of which intersect the slot at points spaced one-third of the length of the slot from its respective ends.

It should be noted that the described slots, scores and perforations may be formed in a corrugated sheet with a single die and in a single operation. It will be readily apparent to those skilled in the art that the slotting, perforating and scoring may be accomplished as part of a continuous operation.

Figure 5:
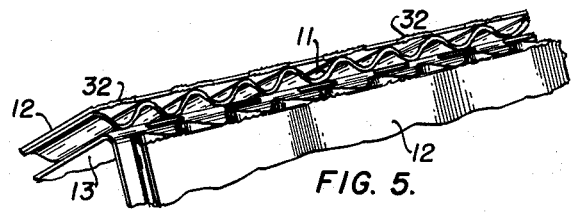
FIGURE 5 is an enlarged fragmentary view of the invention illustrating the severance of one liner and the fluting member of a corrugated sheet during folding of the invention.
Figure 7:
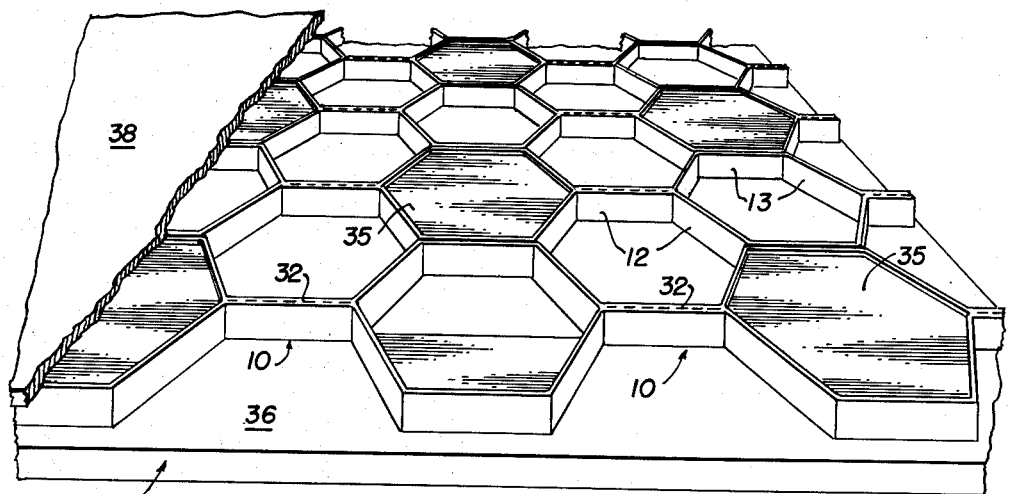
FIGURE 7 is an enlarged perspective view of a honeycomb section received on a laminating frame and showing a facing sheet in position for bonding to one side of the honeycomb section.
Figure 6:
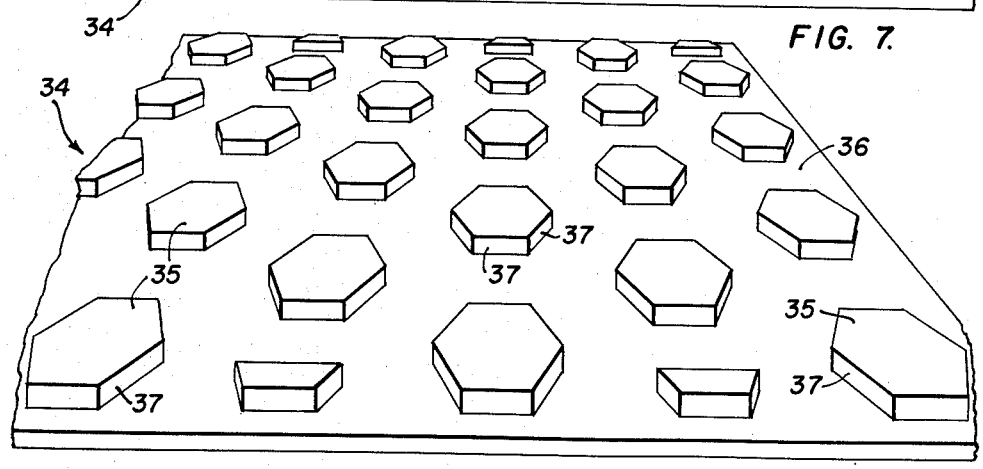
FIGURE 6 is a broken perspective view of a laminating frame of the invention.

After the described slotting, perforating and scoring, the sheet 10 is accordion folded along the rows 14–22 of slots. As best shown in FIGURE 5, folding of the sheet 10 severs one liner 12 or 13 along the perforations at the outer edge of each fold and also severs the perforated fluting therebeneath; this separation results from longitudinal stretching of one liner 12 (with reference to FIGURE 5) as the board is folded about the opposite or inner liner 13. It will be noted, however, that there is no stretching on the inner edge of each fold and that the inner liner 13 is not severed. At successive folds the liners 12 and 13 are alternately severed because the same liner which constitutes the inner edge of one fold becomes the outer member at the next fold. Once the sheet 10 has been folded and the outer edge of each fold has been severed, the folded sheet loses its tendency to return to its original shape; extension of the folded sheet in a direction perpendicular to the plane of the liners 12 and 13 causes bending at the score lines 33 and the folded sheet reopens as a honeycomb structure. The thickness of the honeycomb structure is equal to the lateral spacing between the rows 14–22 of slots; the length of the structure is somewhat shorter than the length of the original corrugated sheet 10; and the width of the honeycomb is a variable depending upon the ratio of the lengths of slots 25–31 to the lateral spacings between the rows of slots. The area covered by the honeycomb structure may actually be greater than the area covered by the original sheet 10. In its expanded form the folded sheet 10 becomes a series of contiguous hexagonal cells. Four of the walls of each cell are of single thickness with respect to the thickness of the sheet 10, but two of the walls at opposite sides of each cell are of double thickness and correspond to portions of the sheet 10 laterally adjacent the perforations 33.

A laminating frame 34 is constructed of a plurality of hexagonal blocks 35 attached to one side of a flat base member 36. Sides 37 of each of the blocks 35 extend vertically upward from the base member 36 and are each adapted to receive an inner wall of a cell of the honeycomb structure. The blocks 35 are regularly spaced from one another and are positioned to receive only selected cells of the honeycomb structure; in the illustrated form of the laminating frame 34 blocks 35 receive and position one-fourth of the cells of the structure. Since the purpose of the blocks 35 is to support the honeycomb in its expanded form, it will be seen that regularly spaced and arranged pegs or grooves may be used for this purpose in place of the hexagonal blocks. With the honeycomb structure positioned upon the laminating frame 34 and with the walls of several cells circumjacently disposed about the hexagonal blocks 35, a corrugated facing board 38 is positioned upon the expanded structure and is cemented thereto. Preferably, a bonding material is applied to the upper edges of walls of the honeycomb structure and coating of these edges may be facilitated by application of a suitable adhesive coating to the upper side of the folded structure before expansion. An inherent advantage in this method of forming a honeycomb structure and laminating it to a facing sheet is the avoidance of intermediate bonding operations whereby double wall members of each cell must be cemented to one another; the rigidity of corrugated board and the support of the expanded honeycomb upon a laminating frame 34 eliminate spreading of double wall members and assure uniformity of the honeycomb structure. The bonded structure, comprised of the honeycomb and a single facing board 38, is then removed from the laminating frame 34 and a second facing sheet 39 may be cemented to the opposite side of the honeycomb.

The invention is not limited to the exemplary construction herein shown and described, but may be made in various ways within the scope of the appended claims.

What is claimed is:

1. The method of making a honeycomb structure from corrugated board, said method comprising: forming parallel rows of longitudinally aligned slots through said board with each slot of each row being spaced from other slots of the same row, forming aligned perforations in said board through its entire thickness between successive slots of each row of slots, accordion folding said board along said rows of slots and perforations, and expanding said folded board into a honeycomb structure.

2. The method of making a honeycomb structure from a laminated sheet of corrugated board including flexible exterior liners, said method comprising: forming parallel rows of slots through said sheet with said slots in alignment with said rows and with all of said slots of equal length and with each slot of each row being spaced by a distance of one-third its length from next preceeding and succeeding slots of the same row and with the center of each slot being positioned in lateral alignment with points equidistant from next adjacent ends of slots in next adjacent rows of slots, forming a plurality of perforations spaced from one another through said sheet with said perforations being positioned between ends of all next adjacent slots in each of said rows of slots, scoring said sheet along continuous lines perpendicular to said slots and with each end of each slot intersecting one of said scored lines, accordion folding said sheet along said rows of slots and perforations, and expanding said folded sheet in a direction substantially perpendicular to said liners of said folded sheet.

3. The invention as defined in claim 2 and wherein: said parallel rows of slots are spaced equidistantly from one another.

4. In the fabrication of honeycomb structures from corrugated board and wherein aligned slots are formed in accordion fold lines on said board, the method of selectively and alternately severing opposite liners of said board at outer edges of said fold lines comprising: forming a plurality of aligned perforations through said board and between said aligned slots, and accordion folding said board along said fold lines.

5. The method of forming a cellular panel from corrugated board, said method comprising: forming parallel rows of slots through a first sheet of corrugated board with said slots of each of said rows being regularly spaced from one another and longitudinally aligned with one another, forming a plurality of aligned perforations through said first sheet and between all next adjacent slots of each of said rows of slots in said first sheet, accordion folding said first sheet on said rows of slots, expanding said first sheet into a honeycomb structure, bonding a second sheet of corrugated board to one face of said honeycomb structure, and bonding a third sheet of corrugated board to the opposite face of said honeycomb structure.

6. The method of forming a honeycomb structure from a sheet of corrugated board including a liner on each face thereof, said method comprising: forming a first series of colinear slots in said sheet, forming a plurality of aligned perforations between each of said slots, forming a second series of colinear slots in said sheet with said second series being parallel with said first series, forming a plurality of aligned perforations between each of said slots in said second series, folding said sheet in one direction along said first series of said slots and perforations, and folding said sheet in the opposite direction along said second series of slots and perforations.

References Cited in the file of this patent

UNITED STATES PATENTS

| | | |
|---|---|---|
| 1,389,294 | Dean | Aug. 30, 1921 |
| 1,996,490 | Romanoff | Apr. 2, 1935 |
| 2,301,538 | Guyer | Nov. 10, 1942 |
| 2,537,026 | Brugger | Jan. 9, 1951 |
| 2,670,314 | Ungar | Feb. 23, 1954 |
| 2,768,924 | Wright | Oct. 30, 1956 |

FOREIGN PATENTS

| | | |
|---|---|---|
| 936,634 | France | Feb. 23, 1948 |